Patented May 7, 1929.

1,712,244

UNITED STATES PATENT OFFICE.

ERNST GIDEON BEK AND EUGEN THOMA, OF PFORZHEIM, GERMANY; SAID THOMA ASSIGNOR TO SAID BEK.

PROCESS OF FINISHING METAL ARTICLES AND THE PRODUCT THEREOF.

No Drawing. Application filed September 23, 1925, Serial No. 58,025, and in Germany December 11, 1924.

This invention relates to articles made of metal, particularly of inexpensive metals coated, finished or covered with a homogeneous, durable and attractive surface, and the process of producing the same.

Heretofore in the industries which are concerned with the production of metal articles, which it is desirable to finish in an attractive manner, the standard practices have been to dip the articles in one of various solutions in order to cover the base metal, or to electroplate a coating thereon or to make the articles out of gold or silver filled stock. Such methods were unsatisfactory for many reasons, particularly in that the methods of treatment were cumbersome and expensive or else the article would soon lose its finish. The method of electrolytically depositing a finish on metal articles is particularly objectionable because the deposit is very loosely bound to the under core or foundation, oxidizes, wears poorly and readily peels from the core or foundation.

In the manufacture of rolled gold articles the well known filling process has been used and consisted primarily in soldering a thin sheet of precious metal, for instance gold, to a sheet of base metal and then rolling the composite sheet to the desired thickness. If the article to be made was then to have a tubular shape and seamless the material had to be cut into a disk and then shaped through a series of dies and finally drawn to the ultimate shape and dimension. If the article was to be made of rolled material, after it had been brought to the desired thickness, blanks were then cut from it which were shaped to the desired size and dimension. It is evident that in both methods a considerable waste of material resulted. The value of the precious metal contained in the waste was then recovered by remelting the material and separating the precious metal from the base metal. It was also found that during the dieing and rolling operations much material was spoiled on account of fracturing the gold covering and uneven distribution of the precious metal on the surface of the base metal. In many instances the latter defects appeared only in the finished article and, consequently such articles had to be added to the waste material and the precious metal recovered therefrom and in addition all the labor and machine operations expended thereon were lost.

In addition to the foregoing objections with respect to the use of the filling process specially skilled operators had to be engaged to conduct and supervise such filling processes. Such articles as were formed by cutting, the precious metal filled material had exposed surfaces of the nonprecious material at the points where the same was cut. In fact many articles which it was desirous of making out of the filled materials could not be so made because of the consequent exposure of the cut and unfilled surfaces. The filling process was further objectionable in that it was never certain what amount of precious metal was contained in the article made from such material and consequently manufacturers of articles from filled materials were not always able to assure purchasers that the precious metal had a relatively precious metal weight with respect to the entire weight of the article.

All articles made according to the first mentioned plating processes in use heretofore were porous and on account of their porosity readily oxidized and were open to the further objection that the gold finish would soon wear off because it was not homogeneously united to the core or foundation, and the filling process was very expensive and cumbersome; it caused much waste in manufacturing and articles made from filled stock showed the base metal on all points where the articles were cut out or filled or soldered. The present invention overcomes the foregoing objections and in addition contributes to the art a very valuble process and products, which products are entirely covered with a finishing coating which finishing coating is attractive, durable and homogeneously united or alloyed to the surface of the core or foundation. It is possible by this method to finish an endless number of metal articles and for the purpose of illustration such articles are mentioned as pencils, safety razor handles and heads, cigarette and vanity cases, rings, mesh fabrics, drawer handles, belt buckles, collar and cuff buttons, etc., etc.

It is also possible by following the steps of the present invention to produce the finish in various colors and shades all as will more fully appear hereinafter.

This invention primarily resides in the manufacture of the core or foundation of the articles to be made by any approved mechanical means such as casting, rolling, stamping, thinning, dieing, drawing, etc., and electrolytically depositing upon such core or foundation a uniform covering of the particular metal with which it is desirous of finishing the articles and then, through moderate heating, eventually very much below the melting point of the core or foundation, homogeneously unite or surface alloy the deposited material to the surface of the core or foundation, care being exercised in avoiding the dissipation or absorption of the deposited material into the core or foundation. The heating step is carefully regulated both as to the degree of heat and the time of heating so as to bring about the homogeneous union or alloying of the deposited material and the surface metal of the core or foundation, which results, if the heating be carried to a sufficiently high temperature, in the formation of mixed crystals, although the advantages of this invention are obtained should the applied temperature be below that at which mixed crystals are formed. Such alloying or homogeneous union is primarily between the deposited metal and the surface of the core or foundation. In such instances where the core or foundation metal will, even with moderate heating, diffuse or absorb the deposit it is necessary to first apply electrolytically or by dipping or by rubbing into such core or foundation, an intermediate film of metal which will prevent the diffusion or absorption of the deposited finishing material by the core or foundation. The intermediate film must be smooth and preferably thin. In fact the intermediate layer need be but one hundred thousandth part of a millimeter in thickness. It is preferable to apply as an intermediate film a metal layer having a melting or softening point which is lower than the melting or softening point of the base metal. In some instances it has been found advantageous to electrolytically deposit a number of intermediate films or layers of different metals for this purpose.

It has been ascertained from experiments that the process of this invention results in what is apparently a welding or alloying of the finishing material to the surface of the core or foundation. Such tests clearly show that mixed crystals are formed at the higher temperatures even in such instances where the deposited metal is only two ten thousandths millimeters in thickness.

It is also possible by the practice of this invention to produce articles in different colors and also to control the shade of such colors. The different colors of the different articles are produced according to the kind of metal constituting the core or foundation of the article or the kind of intermediate layer deposited thereon and the particular kind of precious metal applied over the core or foundation or intermediate layer. The shades of such colors are controlled by the degree of heat utilized in homogeneously uniting or welding the precious metal and the surface beneath it.

Referring particularly to the use of gold as the finishing material it has been found that the color of the gold is darker or more reddish when the degree of heat applied thereto is 400° centigrade on a copper base or with a copper intermediate layer and that the color (of the gold) becomes lighter with increased heat, 50° centigrade of heat making a noticeable difference in the shade of the color.

For the purpose of illustrating this invention the following specific examples are set forth:

*Example 1.*—Chains made of a core or foundation of copper or copper alloys which it is desirous of finishing in gold are treated as follows:

The chains are carefully cleansed to remove all dirt, fat, oxidation and other foreign substances as is known in electroplating. There is then electrolytically deposited thereon a specific amount of fine gold say from 12½ to 25 grams per kilo to the weight of the finished article. The chains, after the fine gold has been deposited thereon, are boiled for about a minute in a solution which may comprise of one part boracic acid, one part borax and one part water, which forms a fluxing agent, allowed to dry and exposed to heat (preferably in a furnace). The degree of heat applied to the articles is dependent upon the shade which it is desirous of producing. After exposure to 550° C. (for about two minutes) the color will be darker or redder than if exposed to slightly higher temperatures. Should heat up to 600° C. be applied (for about two minutes) the gold will be lighter than at the lower temperature. By using higher temperatures, even up to the melting point of the materials, but shortening the time of exposure, correspondingly satisfactory results may be obtained.

*Example 2.*—If it should be desirous of treating bronze chains they are treated exactly as above set out in connection with copper chains but the shade of the gold will be quite lighter at the specified temperatures.

*Example 3.*—For the production of cylindrical or tubular articles, such as for instance pencil and pen barrels, the following example is given:

(1) A sheet of brass about two-thirds copper and one-third zinc is cut to disk form and then reduced to a tube by drawing it through dies as is well understood in the art.

The tube just before it gets its final draw, that is just before it is advanced through the last die which gives it its final shape, is (2) cleansed by dipping it into a solution containing in proportion 48 ounces nitric acid, 64 ounces sulfuric acid and one-third ounce table salt. The dipping solution must be carefully prepared in as much as it develops considerable heat and care must be taken to pour the sulfuric acid into the nitric acid. (3) The tubes are momentarily dipped for a second or two in this solution (4) washed in water and (5) while still moist from the water bath put in a solution containing 2 pennyweights of $C_4H_5O_6K$ (cream of tartar) per liter of water which prevents oxidation upon the surface of the metal and retained in this solution until it is desirous of treating them according to the next step of process. (6) The articles are then polished with a brass or steel wire brush and soapy water, which step is advantageous in order to increase the brightness and smoothness of the finished article. (7) In order to remove the fat of this operation the article is momentarily dipped in a solution containing about 45 grams of cyanide of potassium to 1 liter of water. (8) The article may then be washed in hot water and then in (9) cold water. (10) The article while still moist is then hung in an electrolyte containing to 1 gallon of distilled water one ounce gold "trysalite salt" $Au_2(CN)_2 2KCNK_2SO_3$, two ounces potassium cyanide and one ounce phosphate of soda. The anodes and cathodes are separated to a distance of about six inches and about two and one-half volts are utilized for depositing the material in the electrolyte on the articles. The temperature of the electrolyte is maintained at about 130° F. The time during which the material of the electrolyte is deposited is controlled dependent upon the amount of precious metal which it is desirous of depositing on the core. It will be found advantageous if the amount of deposit is ascertained and controlled by weighing the articles previous to immersion in the electrolyte and periodically checking the weight until such an amount of deposit has been formed on the core as is desired. (11) The article is removed from the electrolyte, after the desired deposit of precious metal has been made thereon, and is then boiled for a minute in a solution of one-third boracic acid powder, one-third borax and one-third water by weight. The article after removal from the last mentioned solution is then allowed to dry. (12) After this preparation has dried, it not only acts as a fluxing agent but also as a protective film to avoid oxidation. (13) The article is then exposed to heat preferably in an electric furnace, to a temperature of 500° C. for about two minutes. (14) The article is then removed from the furnace and allowed to cool and after cooling is put in a suitable tumbling barrel containing steel beads and soap and a few drops of sal ammoniac and thereby polished. (15) The article is then reduced to its final diameter by passing it through the last of the dies and then cut to the length desired.

The finishing of pencil and pen barrels according to this invention may also be done after the final drawing provided the barrels are not too thin to withstand the heat of the alloying operation.

An article prepared according to this process having a deposit of 12.5 grams fine gold per kilo will show a medium shade of green gold as it is recognized in the jewelry trade. If the temperature is increased to 550° C. (instead of 500° C.) the ultimate color will be lighter approximating a yellow greenish gold. Should the temperature utilized be 600° centigrade the color will be still lighter.

The article is then ready to be converted by the ordinary mechanical operations into a finished pencil or pen or other articles.

*Example 4.*—If it is desirous of producing different colors, e. g., red gold and its varying shades, a preliminary deposit is made on the core immediately before the treatment of step 10 which preliminary deposit consists in placing the core in a copper bath for about one minute in order to deposit thereon a thin film of copper which in the ultimate heating will give the gold a reddish color, at about 550° and if higher temperatures are used the color will be correspondingly lighter. In the heating an alloy is formed between the surface of the base or core, the intermediate layer and the deposit.

*Example 5.*—The same reddish gold effect may be obtained by using a core or base which contains 80 to 90% copper and only 20 to 10% zinc instead of the brass alloy containing two-thirds copper and one-third zinc, otherwise the procedure is the same.

*Example 6.*—In preparing articles with a silver finish the steps of Example 3 are followed up to and including step 9 but a different electrolyte must be utilized instead of that set forth in step 10. This silver electrolyte should contain 11 ounces of silver "trysalite salts" $Ag_2(CN)_2 2KCNK_2SO_3$ one-half ounce potassium chloride to one gallon of distilled water and the temperature maintained at about 70° F. The anode and cathode spaced about six inches apart and the voltage utilized from one to one and one-half volts. The temperature of the furnace, if but 25 grams of silver per kilo are deposited on the tube, should be maintained at about 450° C. instead of 500°. The temperature with but such a light deposit of silver should not exceed 500° C. but with heavier deposits of silver the temperature may be increased to almost 600° C. in order to produce lighter shades of silver.

In operating with an intermediate or intermediate layers the following examples are given:

*Example 7.*—In the case of German silver the article is first thoroughly cleansed, covered electrolytically with a thin film of pure copper, then electrolytically covered with the desired fine film of gold, boiled in the solution of boracic acid and exposed to heat from 600 to 650° centigrade, depending upon the shade of gold desired.

*Example 8.*—Other intermediate layers which may be utilized may consist of any desired metals, for instance, silver and copper or gold and copper or silver and zinc or other combinations. Should the silver-copper intermediate layer be used on German silver at the temperatures given in Example 7 the color of the gold will be a light yellowish green. Should the gold-copper intermediate layer be used in Example 7 the color will be reddish, and should the silver-zinc intermediate layer be used in Example 7 the color will be whitish. It is evident that from actual tests and trials many other combinations of intermediate layers may be used to produce different colors and shades of such colors.

*Example 9.*—It is also possible to produce such articles as mesh fabrics having portions thereof made in different colors and in definite designs. By utilizing a mesh machine of the type shown and described in the application of Friedrich A. K. Rolle, Serial No. 582,844, filed August 19, 1922, a mesh fabric can be produced on the said machine out of copper (solder filled) wire and brass solder filled wire, interlinked in definite designs. The fabric is then cleansed, fine gold deposited thereon electrolytically in a very thin film (ranging from 1/80 to 1/40 of the weight of the mesh) then boiled in the solution of boracic acid and exposed to heat say from 550 to 650° centigrade according to the shades of gold desired. The finished article will bring out the design woven in the copper wire in quite a reddish gold while the brass wire will be yellowish and, of course, it is evident that such an article will be very attractive in appearance not only that the colors differ but also that the colors have the form of definite designs.

*Example 10.*—It is likewise to be understood that the intermediate layers may be utilized in the production of mesh fabrics to bring about various color effects and shades.

*Example 11.*—By utilizing the same Rolle machine articles may be made of more than two wires woven in different designs. Thus, for instance, three wires might be utilized say of copper, white metal and brass and treated according to the steps of Example 9.

*Example 12.*—Silver mesh may be produced in very fine yellowish gold shades by first thoroughly cleaning the mesh formed on a suitable machine, electrolytically depositing thereon a thin film of fine gold and heating the material between 450 to 550° centigrade according to the color desired. Varying the temperature but 25 degrees will materially affect the shade of the color. If the gold deposited is as heavy as 25 or 50 grams per kilo the color of the silver is very much subdued and the finish is more of a yellow whitish gold appearance.

*Example 13.*—To produce a white silver like finish which has exceedingly hard wearing qualities it is suggested that the article be made of brass (for example brass mesh) and after cleansing treated in an electrolyte containing plating salts. The following plating salts (Trysalite salts $Ag_2(CN)_2.2KCN.K_2SO_3.$)

are recommended in the following proportions by weight:

50% silver, 35% brass, 10% cadmium, and 5% copper.

To one and one-half ounces of these metal salts is added one liter of distilled water. In depositing on the brass wire it is advisable to use a silver anode. The anode and cathode are separated about six inches and the material is treated in a bath for about one hour. The electric current utilized may vary from one to one and one-half volts. After the material comes from the electrolyte the aforementioned boracic acid treatment is applied to it and the material is then heated to a temperature of 500° C. for about three minutes. The temperature may vary to as high as 550° C. with the resultant lighter shade of the silver finish.

In all the foregoing examples it is advisable to give the articles, after they come from the electrolyte and before heating, the boracic acid bath treatment as set forth in Example 1.

The articles, instead of being heated to the temperatures below their melting points, may be heated to the melting point of the metal constituting the core or foundation but where such temperatures are used the article should be dipped into a solution of rosin dissolved in alcohol and then covered with graphite or Paris rouge or the like.

The foregoing examples setting forth this invention are given for the purpose of illustrating how the invention may be utilized but it is not intended thereby to limit the same to the specific articles set out in said examples or the specific finishing materials utilized. The invention being of such scope as to contemplate the use of any finishing materials, which will be apparent from the entire disclosure of the specification.

What we claim is:

1. The process of producing an article having a base metal foundation and a precious metal surface interalloyed therewith and of predetermined composition and color which comprises coating the surface of the article with a film of precious metal having a weight less than approximately 1/40 of the weight of the article and subjecting the coated article to heat at a temperature lower than the melting point of the metal of the article and of the coating and for a time sufficient to cause inter-alloying between the precious metal of the coating and the metal of the foundation to produce a finished precious metal surface of predetermined composition and color without completely absorbing the precious metal into the metal of the article.

2. The process of producing an article having a metal foundation and a precious metal surface of predetermined composition and color which comprises electrolytically depositing an exceedingly thin film of precious metal on the article, subjecting the article with the electro-deposited film of precious metal to heat and regulating the heat and the time exposure thereto in relation to the thickness of the said film to control the relative percentage of interalloying to be effected between the article and the precious metal and the resulting color.

3. The process of producing an article with a precious metal finish having a predetermined color value and composition which comprises applying to the article a precious metal, alloying the precious metal with the base at a selected temperature, the selected temperature controlling the ultimate color and composition of the precious metal alloy to be produced and being below the melting point of either metal and being within a range extending from the neighborhood of approximately 400° to 700° C., whereby the degree of interalloying between the metal of the base and the precious metal is controlled.

4. The process of producing an article with a precious metal finish having a predetermined composition and color which comprises applying to the article precious metal, alloying the applied precious metal with the base by the application of heat, and controlling the relative percentage of interalloying of the base and the precious metal and the resulting color by regulating the heat, 5. The process of producing an article with a precious metal finish having a predetermined composition which comprises plating the article with precious metal and alloying the metal to the base at a temperature, said temperature depending upon the ultimate composition and color of the alloy to be produced, by heating the base and the applied metal below the melting point of either metal to control the amount of base metal alloyed with the applied metal.

6. An article of manufacture comprising a metallic foundation having a predetermined configuration and representing a complete article of manufacture, a precious metal finish upon the exposed surfaces thereof encasing said article with a precious metal covering, said precious metal covering being directly alloyed with the foundation metal and said alloy comprising only the interalloyed metal of the foundation and precious metal and having the precious metal constituent predominating therein and exhibiting a precious metal finish, the precious metal being modified, in composition and color, by the alloyed foundation metal.

In testimony whereof we have hereunto set our hands.

ERNST GIDEON BEK.
EUGEN THOMA.